United States Patent
Kanai et al.

(10) Patent No.: US 10,736,184 B2
(45) Date of Patent: Aug. 4, 2020

(54) POWER SUPPLY APPARATUS FOR INDUCTION HEATING

(71) Applicant: NETUREN CO., LTD., Tokyo (JP)

(72) Inventors: Takahiko Kanai, Tokyo (JP); Masato Sugimoto, Tokyo (JP); Haruki Yoshida, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 309 days.

(21) Appl. No.: 15/569,467

(22) PCT Filed: May 31, 2016

(86) PCT No.: PCT/JP2016/002623
§ 371 (c)(1),
(2) Date: Oct. 26, 2017

(87) PCT Pub. No.: WO2016/194365
PCT Pub. Date: Dec. 8, 2016

(65) Prior Publication Data
US 2018/0092162 A1    Mar. 29, 2018

(30) Foreign Application Priority Data
Jun. 4, 2015    (JP) .................................. 2015-113734

(51) Int. Cl.
*H05B 6/04*    (2006.01)
*H05B 6/12*    (2006.01)
(Continued)

(52) U.S. Cl.
CPC ............ *H05B 6/04* (2013.01); *H02M 7/5387* (2013.01); *H05B 6/06* (2013.01)

(58) Field of Classification Search
CPC .......... H05B 6/06; H05B 6/04; H02M 7/5387
(Continued)

(56) References Cited

U.S. PATENT DOCUMENTS

| 2011/0181993 | A1 | 7/2011 | Yamaguchi |
| 2012/0261405 | A1* | 10/2012 | Kurose ................ H05B 6/062 219/620 |
| 2014/0321171 | A1 | 10/2014 | Fujita et al. |

FOREIGN PATENT DOCUMENTS

| JP | 11069834 | 3/1999 |
| JP | 2007095346 | 4/2007 |

(Continued)

OTHER PUBLICATIONS

International Search Report and Written Opinion of the International Searching Authority, dated Sep. 9, 2016 in corresponding International Application No. PCT/JP2016/002623.

*Primary Examiner* — Quang T Van
(74) *Attorney, Agent, or Firm* — Wenderoth, Lind & Ponack, L.L.P.

(57) ABSTRACT

A power supply apparatus for induction heating is provided. The power supply apparatus includes a smoothing filter configured to smooth a pulsating current of DC power output from a DC power supply, and an inverter configured to convert the DC power that has been smoothed by the smoothing filter into AC power. The smoothing filter includes a plurality of capacitors having different internal inductances and connected to each other in parallel between input terminals of the inverter, each of the capacitors being connected to the input terminals of the inverter directly or through a pair of bus bars. The plurality of capacitors includes a first capacitor and a second capacitor, the first capacitor having smaller internal inductance than the second capacitor and a shorter conductive path between the input terminals of the inverter than the second capacitor.

11 Claims, 3 Drawing Sheets

(51) Int. Cl.
*H02M 5/45* (2006.01)
*H05B 6/06* (2006.01)
*H02M 7/5387* (2007.01)

(58) Field of Classification Search
USPC ....... 219/660, 620, 622, 623, 624, 626, 665,
219/668, 671, 675; 363/57, 37, 49,
363/56.01, 96, 124
See application file for complete search history.

(56) References Cited

FOREIGN PATENT DOCUMENTS

| | | |
|---|---|---|
| JP | 2009-277577 | 11/2009 |
| JP | 2011-259622 | 12/2011 |

\* cited by examiner

POWER SUPPLY APPARATUS FOR INDUCTION HEATING

TECHNICAL FIELD

The present invention relates to a power supply apparatus for induction heating.

BACKGROUND ART

A related art power supply apparatus is configured to supply AC power to a heating cod for induction heating in which a workpiece placed in a magnetic field formed by the heating coil due to the AC power supplied to the heating coil is heated by current induced in the workpiece. The power supply apparatus generally converts AC power of a commercial power supply into DC power by a converter, smoothes a pulsating current of the DC power by a capacitor, and converts the smoothed DC power into AC power by an inverter to generate high frequency AC power to be supplied to the heating coil (see, e.g., JP 2009-277577A).

The inverter typically includes a plurality of pairs of series-connected power semi-conductor devices (switching devices), the pairs being connected to each other in parallel. The heating coil is connected between series connection points between the power semiconductor devices in the respective pairs so that high frequency AC power can be supplied to the heating coil by high speed switching operations of the power semiconductor devices.

The high speed switching operation of the power semiconductor device rapidly changes the current flowing into the power semiconductor device, and the current change di/dt generates surge voltage L×di/dt between opposite terminals of the power semiconductor device due to a parasitic inductance. L of a conductive path between the power semiconductor device and the capacitor serving as a voltage source. Excessive surge voltage may cause damage to the power semiconductor device. Thus, the surge voltage is .required to be suppressed. Since the current change di/dt is determined primarily by the characteristics of the power semiconductor device, the surge voltage can be suppressed by reducing the parasitic inductance L.

As a measure for reducing the parasitic inductance, a capacitor serving as a voltage source is typically provided in the vicinity of a load. However, in a large power application such as in a power supply apparatus for induction heating, a capacitor is required to have relatively large capacitance, so it is difficult to arrange the capacitor in the vicinity of the power semiconductor device (the load). This is because the size of the capacitor increases with the increase of the capacitance.

SUMMARY

Illustrative aspects of the present invention provide a power supply apparatus for induction heating in which surge voltage can be suppressed to strengthen a protection of an inverter.

According to an illustrative aspect of the present invention, a power supply apparatus for induction heating is provided. The power supply apparatus includes a smoothing filter configured to smooth a pulsating current of DC power output from a DC power supply, and an inverter configured to convert the DC power that has been smoothed by the smoothing filter into AC power. The smoothing filter includes a plurality of capacitors having different internal inductances and connected to each other in parallel between input terminals of the inverter, each of the capacitors being connected to the input terminals of the inverter directly or through a pair of bus bars. The plurality of capacitors includes a first capacitor and a second capacitor, the first capacitor having smaller internal inductance than the second capacitor and a shorter conductive path between the input terminals of the inverter than the second capacitor.

DESCRIPTION OF EMBODIMENTS

Figure 1:
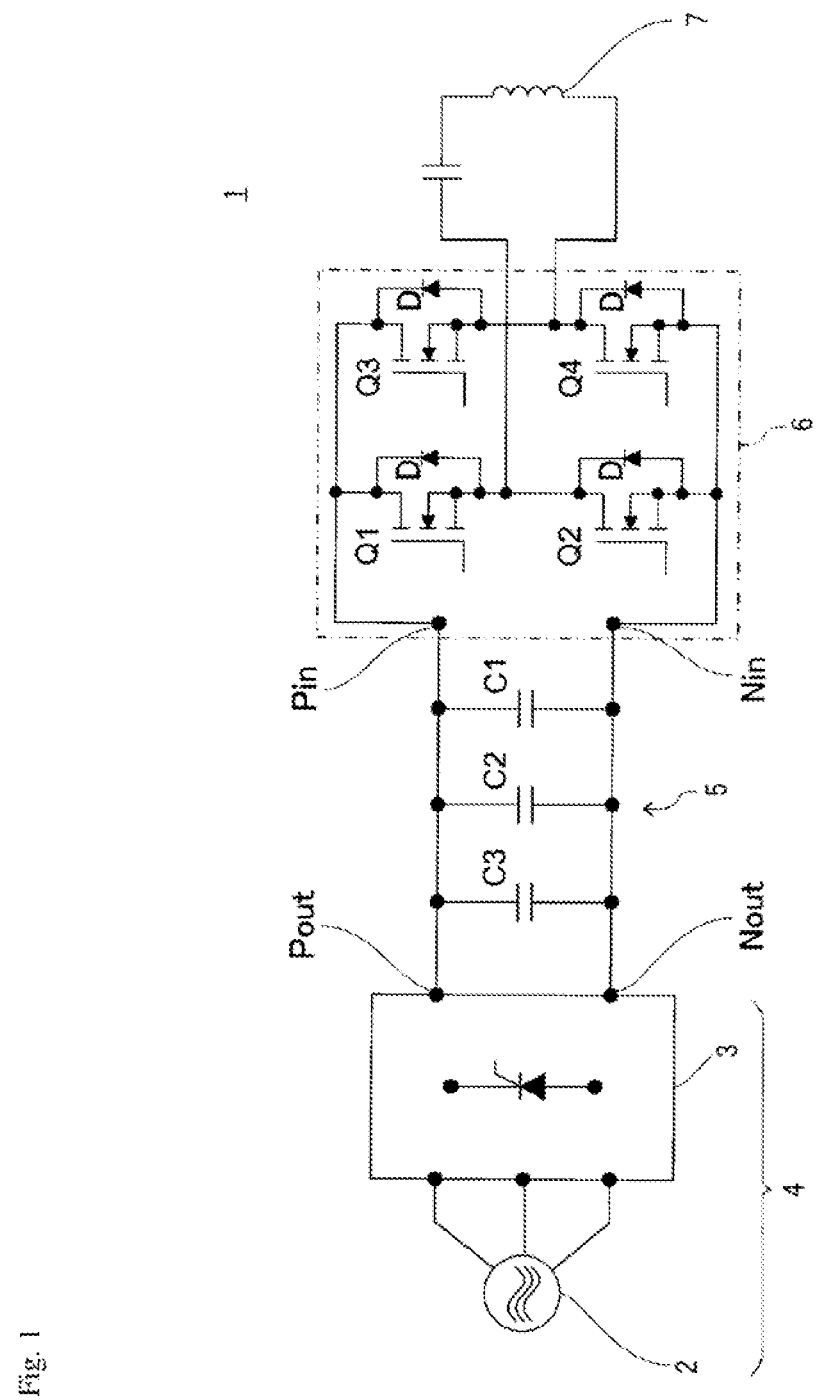
FIG. 1 is an example of a circuit diagram of a power supply apparatus according to an embodiment of the present invention.

Hereinafter, embodiments of the present invention will be described in detail with reference to the drawings. FIG. 1 illustrates an example of a power supply apparatus 1 according to an embodiment of the present invention. The power supply apparatus 1 is for use in induction heating.

The power supply apparatus 1 has a DC power supply 4, a smoothing filter 5, and an inverter 6. The DC power supply 4 includes a converter 3 configured to converts AC power supplied from a commercial AC power supply 2 into DC power. The smoothing filter 5 is configured to smooth a pulsating current of the DC power output from the DC power supply 4. The inverter 6 is configured to convert the DC power that has been smoothed by the smoothing filter 5 into high frequency AC power.

The inverter 6 has a pair of power semiconductor devices Q1, Q2 connected in series, and another pair of power semiconductor devices Q3, Q4 also connected in series. The pair of power semiconductor devices Q1, Q2 and the pair of power semiconductor devices Q3, Q4 are connected to each other in parallel. In addition, freewheeling diodes D are connected in parallel with the power semiconductor devices Q1, Q2, Q3, Q4 respectively.

For example, various power semiconductor devices which can perform switching operation, such as an insulated gate bipolar transistor (IGBT) and a metal-oxide-semiconductor field-effect transistor (MOSFET) may be used as each power semiconductor device. In addition, examples of the material of the power semi-conductor device include silicon (Si) and silicon carbide (SiC).

A heating coil 7 is connected between a series connection point of the paired power semiconductor devices Q1, Q2 and a series connection point of the paired power semi-conductor devices Q3, Q4 so that high frequency power can be supplied to the heating coil 7 by switching operations of the power semiconductor devices Q1, Q2, Q3, Q4.

The smoothing filter 5 includes a plurality of capacitors. In the illustrated example, the smoothing filter 5 is configured to include three capacitors C1, C2, C3. The capacitors C1, C2, C3 are connected to each other in parallel between a positive electrode Pout and a negative electrode Nout of output terminals of the convener 3 and between a positive electrode Pin and a negative electrode Nin of input terminals of the inverter 6. Capacitance required for the smoothing filter 5 in the power supply apparatus 1 for induction heating can be covered by the sum of capacitances of the capacitors C1, C2, C3.

Figure 2:
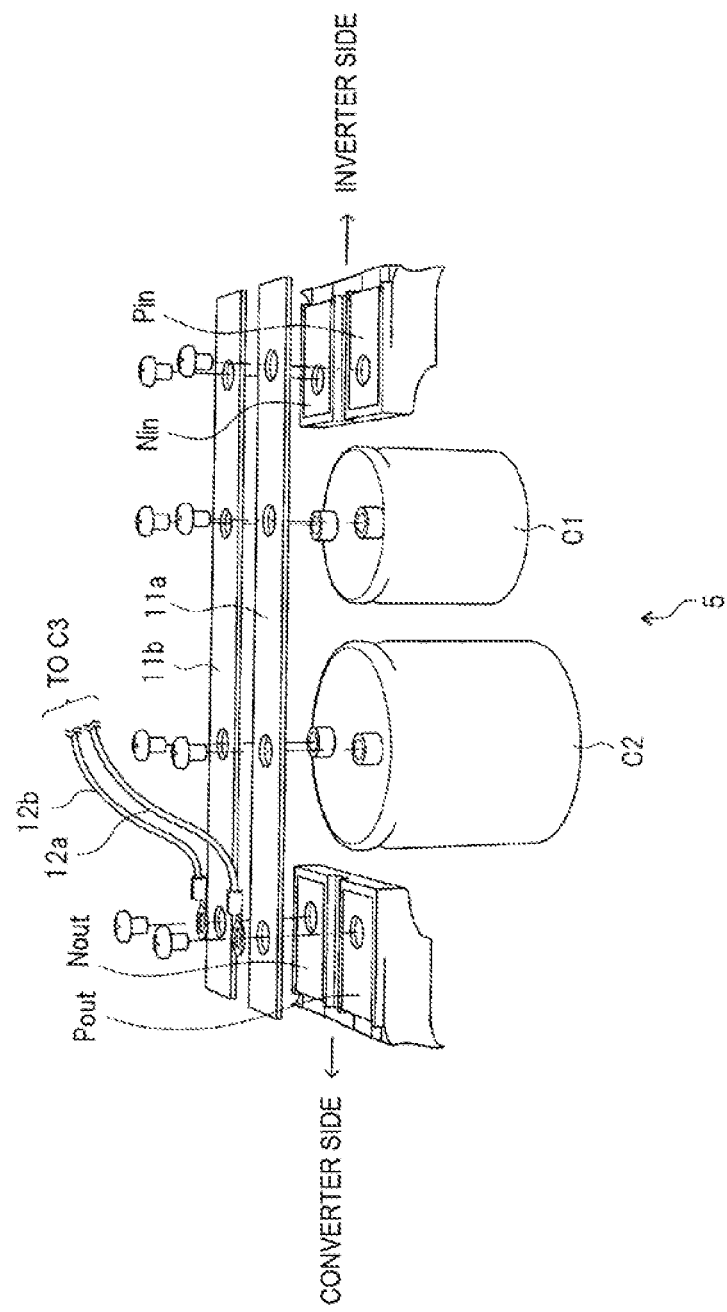
FIG. 2 is a perspective view of an example of a configuration of a smoothing filter of the power supply apparatus.

FIG. 2 shows a specific configuration example of the smoothing filter 5.

The positive electrode Pout of the output terminal of the converter 3 and the positive electrode Pin of the input terminal of the inverter 6 are connected to each other through a bus bar 11a. The negative electrode Nout of the output terminal of the converter 3 and the negative electrode Nin of the input terminal of the inverter 6 are connected to each other through a bus bar 11b.

Among the three capacitors C1, C2, C3 included in the smoothing filter 5, the capacitors C1, C2 are arranged to bridge between the pair of bus bars 11a, 11b and are connected in parallel to each other between the input terminals (Pin and Nin) of the inverter 6. In addition, the capacitor C3 is connected in parallel with the capacitors C1, C2 through a pair of electric wires 12a, 12b. While the electric wires 12a, 12b are connected to connection terminals of the bus bars 11a, 11b on the side of the converter 3 in the illustrated example, the electric wires 12a, 12b may be connected to connection terminals of the bus bars 11a, 11b on the side of the inverter 6 alternatively, The connection places of the electric wires 12a, 12b are not limited particularly.

The capacitors C1, C2 connected to each other in parallel between the input terminals of the inverter 6 through the bus bars 11a, 11b are disposed in the vicinity of the input terminals and the lengths of conductive paths of the capacitors C1, C2 between the input terminals are designed to be as short as possible.

Generally, each of the bus bars is higher in the degree of freedom in shape than each of the electric wires, advantageously in reduction of parasitic inductance. Further, the lengths of the conductive paths of the capacitors C1, C2 are set to be as short as possible. Thus, each of parasitic inductances of the conductive paths between the capacitors C1, C2 and the power semiconductor devices Q1, Q2, Q3, Q4 (see FIG. 1) of the inverter 6 is smaller than a parasitic inductance of a conductive path between the capacitor C3 connected in parallel with the capacitors C1, C2 through the electric wires 12a, 12b and the power semiconductor devices Q1, Q2, Q3, Q4.

Power is supplied by priority to the power semiconductor devices Q1, Q2, Q3, Q4 of the inverter 6 from each of the capacitors C1, C2 in which the parasitic inductance (impedance) of the conductive path is relatively small. Thus, surge. voltage occurring between opposite terminals of the power semiconductor devices Q1, Q2, Q3, Q4 due to the parasitic inductance can be suppressed.

A film capacitor, a ceramic capacitor, or the like, which generally has a smaller impedance (inductance component) in a high frequency range (e.g., not lower than 100 kHz) than an electrolytic capacitor such as an aluminum electrolytic capacitor is preferably used as each of the capacitors C1, C2 from the viewpoint of suppressing the surge voltage.

On the other hand, mainly from the viewpoint of eliminating the pulsating current, it is preferable that the capacitor C3 has a larger capacitance than the capacitor C1, C2. For example, an aluminum electrolytic capacitor, a film capacitor, or the like, is preferably used as the capacitor C3. Thus, the capacitor C3 having a relatively large capacitance has a larger overall size than the capacitor C1, C2. The capacitor C3 is disposed in a suitable free space in the power supply apparatus 1 by use of the degree of freedom for arranging the electric wires.

Here, in the power supply apparatus 1, internal inductances of the capacitors C1, C2 connected to each other in parallel between the input terminals of the inverter 6 through the bus bars 11a, 11b are different from each other. The internal inductance of the capacitor C1 is smaller than the internal inductance of the capacitor C2. In addition, the lengths of the respective conductive paths of the capacitors C1, C2 between the input terminals of the inverter 6 are different from each other. The length of the conductive path of the capacitor C1 is shorter than the length of the conductive path of the capacitor C2.

Figure 3:
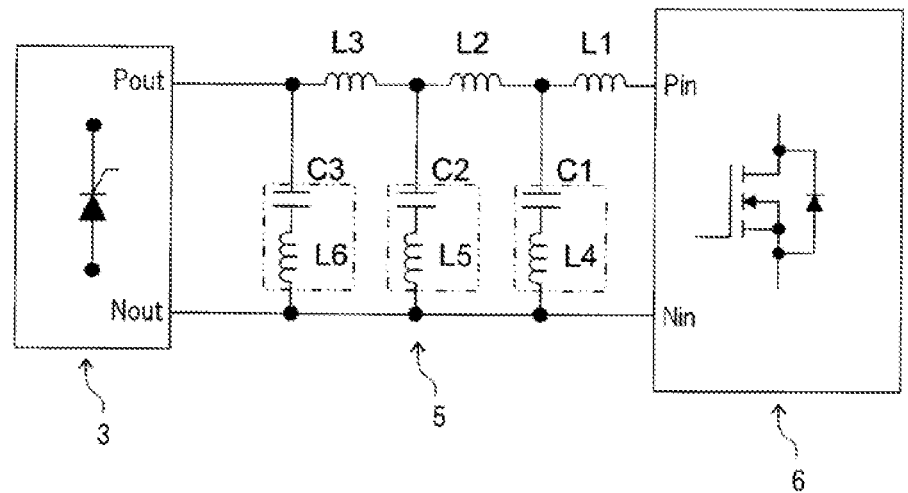
FIG. 3 is an equivalent circuit diagram of the smoothing filter of FIG. 2.

FIG. 3 shows an equivalent circuit of the smoothing filter 5 in FIG. 2.

A parasitic inductance SL1 of the conductive path of the capacitor C1 between the input terminals of the inverter 6 is equal to a combination (SL1=L1+L4) of a wiring inductance L1 of a section between the capacitor C1 and the input terminals in the bus bars 11a, 11b and an internal inductance IA of the capacitor C1.

Similarly, a parasitic inductance SL2 of the conductive path of the capacitor C2 is equal to a combination (SL2=L1+L2+L5) of a wiring inductance L1+L2 of a section between the capacitor C2 and the input terminals in the bus bars 11a, 11b and an internal inductance L5 of the capacitor C2.

The parasitic inductance SL3 of the conductive path of the capacitor C3 is equal to a combination (SL3=L1+L2+L3+L6) of a wiring inductance L1+L2+L3 of the bus bars 11a, 11b and the electric wires 12a, 12b and an internal inductance L6 of the capacitor C3.

As to the capacitors C1, C2 connected to each other in parallel between the input terminals of the inverter 6 through the bus bars 11a, 11b, the internal inductance L4 of the capacitor C1 whose conductive path length between the input terminals is relatively short is smaller than the internal inductance L5 of the capacitor C2 whose conductive path length between the input terminals is relatively long (L4<L5). In addition, the wiring inductance L1 included in the conductive path of the capacitor C1 whose conductive path length is relatively short is smaller than the wiring inductance L1+L2 included in the conductive path of the capacitor C2 whose conductive path length is relatively long (L1<L1+L2).

Accordingly, the parasitic inductance SL1 of the conductive path of the capacitor C1 is smaller than the parasitic inductance SL2 of the conductive path of the capacitor C2. Power is supplied by priority to the power semiconductor devices Q1, Q2, Q3, Q4 of the inverter 6 from the capacitor C1 which is relatively small in terms of the parasitic inductance (impedance) of the conductive path. Thus, surge voltage occurring between the opposite terminals of the power semiconductor devices Q1, Q2, Q3, Q4 due to the parasitic inductance can be suppressed more greatly so that protection of the inverter 6 can be enhanced.

Thus, of the capacitors C1, C2 connected to each other in parallel between the input terminals of the inverter 6 through the bus bars 11a, 11b, the internal inductance of the capacitor C1 whose conductive path length between the input terminals is short is reduced. Thus, the parasitic inductance of the conductive path of the capacitor given priority for power supply can be reduced so that the surge voltage can be suppressed effectively.

Particularly, in a case in which the capacitors C1, C2 are a same type of capacitor, the capacitor having smaller internal inductance has a smaller overall size. With the internal inductance of the capacitor C1 being reduced, the distance between the capacitor C1 and the input terminals of the inverter 6 can be shortened so that the wiring inductance L1 included in the conductive path of the capacitor C1 can be reduced. Thus, surge voltage can be suppressed further.

Figure 4:
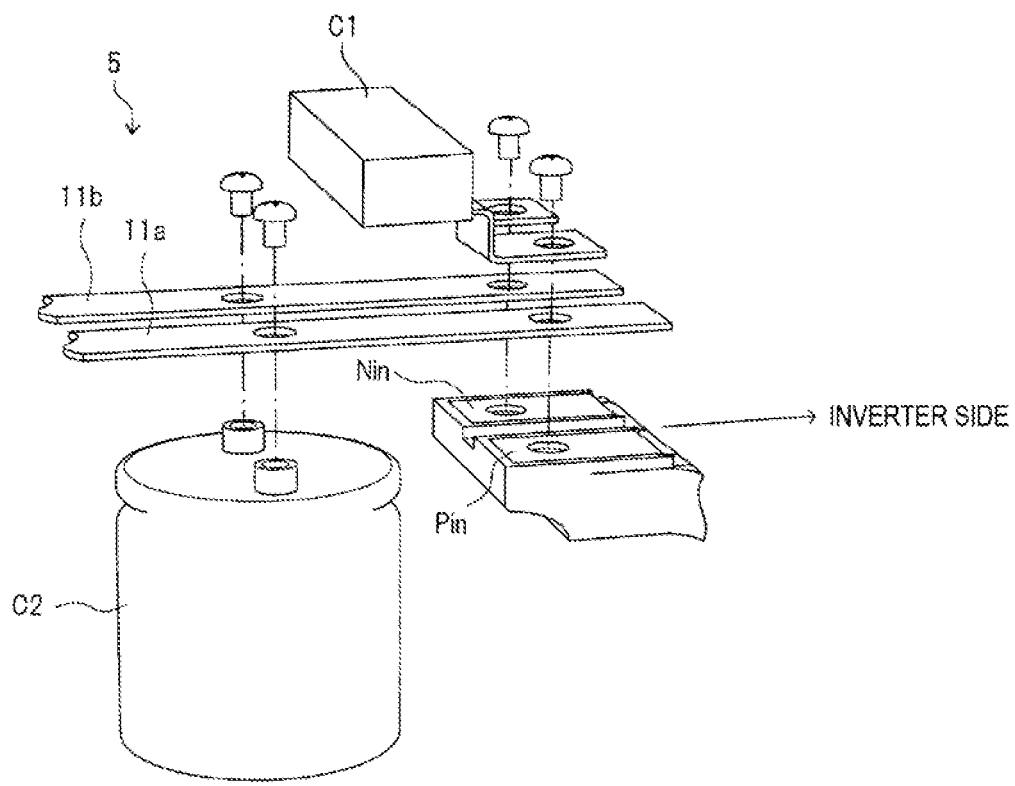
FIG. 4 is a perspective view of another example of a configuration the smoothing filter.

FIG. 4 illustrates another example of the smoothing filter 5 of the power supply apparatus 1. The smoothing filter 5 has a capacitor C1 connected directly to the input terminals of the inverter 6. In this case, a wiring inductance L1 included in a conductive path of the capacitor C1 can be substantially 0 so that surge voltage can be suppressed further greatly.

While the present invention has been described with reference to certain embodiments thereof, the scope of the present invention is not limited to the embodiments described above, and it will be understood by those skilled in the art that various changes and modifications may be made therein without departing from the scope of the present invention as defined by the appended claims.

For example, the number of capacitors connected to each other in parallel between the input terminals of the inverter 6 through the bus paths 11a, 11b is not limited to two, and three or more capacitors having different internal inductances may be used and connected to each other in parallel such that the capacitor having smaller internal inductance has a shorter conductive path between the input terminals.

This application is based on Japanese Patent Application No. 2015-113734 filed on Jun. 4, 2015, the entire content of which is incorporated herein by reference.

The invention claimed is:

1. A power supply apparatus for induction heating, the power supply apparatus comprising:
   a smoothing filter configured to smooth a pulsating current of DC power output from a DC power supply; and
   an inverter configured to convert the DC power that has been smoothed by the smoothing filter into AC power,
   wherein the smoothing filter comprises a plurality of capacitors having different internal inductances and connected to each other in parallel between input terminals of the inverter, each of the capacitors being connected to the input terminals of the inverter directly or through a pair of bus bars, and wherein the plurality of capacitors comprises a first capacitor and a second capacitor, the first capacitor having smaller internal inductance than the second capacitor and a shorter conductive path between the input terminals of the inverter than the second capacitor.

2. The power supply apparatus according to claim 1, wherein the first capacitor and the second capacitor are a same type of capacitor, and wherein the first capacitor having the shorter conductive path between the input terminals of the inverter than the second capacitor has a smaller overall size than the second capacitor.

3. The power supply apparatus according to claim 1, wherein each of the capacitors is a film capacitor or a ceramic capacitor.

4. The power supply apparatus according to claim 1, wherein the first capacitor has a smallest internal inductance among the plurality of capacitors, and wherein the first capacitor is connected directly to the input terminals of the inverter.

5. The power supply apparatus according to claim 1, wherein the smoothing filter further comprises at least one additional capacitor having larger capacitance than each of the plurality of capacitors, the at least one additional capacitor being connected in parallel with the plurality of capacitors through a pair of electric wires.

6. The power supply apparatus according to claim 2, wherein each of the capacitors is a film capacitor or a ceramic capacitor.

7. The power supply apparatus according to claim 2, wherein the first capacitor has a smallest internal inductance among the plurality of capacitors, and wherein the first capacitor is connected directly to the input terminals of the inverter.

8. The power supply apparatus according to claim 3, wherein the first capacitor has a smallest internal inductance among the plurality of capacitors, and wherein the first capacitor is connected directly to the input terminals of the inverter.

9. The power supply apparatus according to claim 2, wherein the smoothing filter further comprises at least one additional capacitor having larger capacitance than each of the plurality of capacitors, the at least one additional capacitor being connected in parallel with the plurality of capacitors through a pair of electric wires.

10. The power supply apparatus according to claim 3, wherein the smoothing filter further comprises at least one additional capacitor having larger capacitance than each of the plurality of capacitors, the at least one additional capacitor being connected in parallel with the plurality of capacitors through a pair of electric wires.

11. The power supply apparatus according to claim 4, wherein the smoothing filter further comprises at least one additional capacitor having larger capacitance than each of the plurality of capacitors, the at least one additional capacitor being connected in parallel with the plurality of capacitors through a pair of electric wires.

* * * * *